Nov. 28, 1944.     W. H. SILVER     2,363,901

TWO-WAY PLOW

Filed May 2, 1942     4 Sheets-Sheet 3

INVENTOR
WALTER H. SILVER
BY
ATTORNEYS

Nov. 28, 1944.  W. H. SILVER  2,363,901
TWO-WAY PLOW
Filed May 2, 1942  4 Sheets-Sheet 4

INVENTOR
WALTER H. SILVER
BY
ATTORNEYS

Patented Nov. 28, 1944

2,363,901

UNITED STATES PATENT OFFICE 2,363,901

TWO-WAY PLOW

Walter H. Silver, Moline, Ill., assignor to Deere & Company, Moline, Ill., a corporation of Illinois Application May 2, 1942, Serial No. 441,488

27 Claims. (Cl. 97—29)

The present invention relates generally to agricultural implements and more particularly to two-way plows adapted for movement alternately into an operating position or into a position in which both units are disposed in their raised or transport position. The object and general nature of the present invention is the provision of a two-way plow of the trailing type in which the furrow openers are connected with a supporting frame by generally parallel link mechanism. A further feature of this invention is the provision of depth adjusting means for tilting the furrow openers so as to raise or lower the points, thereby decreasing or increasing the amount of suction and causing the furrow opener to take a more shallow position or a deeper plowing position.

A further feature of the present invention is the provision of a two-way plow having a laterally swingable hitch connection which is automatically controlled by the operation of the mechanism for raising and lowering the plowing units. More specifically, it is a feature of this invention to provide a two-way plow in which the furrow openers are floatingly connected with a supporting frame and are raised into a transport position by raising mechanism with which a laterally swingable hitch member is so connected that when the raising mechanism operates to permit one or the other of the plowing units to lower, the hitch is swung into a position longitudinally in front of the unit to be lowered before the unit actually reaches lowered position. A further feature of this invention is the provision of a two-way plow in which the operation of the raising mechanism controls the laterally swingable hitch independently of the movement of the associated plowing unit into its operating position.

These and other objects and advantages of the present invention will be apparent to those skilled in the art after a consideration of the following detailed description, taken in conjunction with the accompanying drawings.

Figure 6:
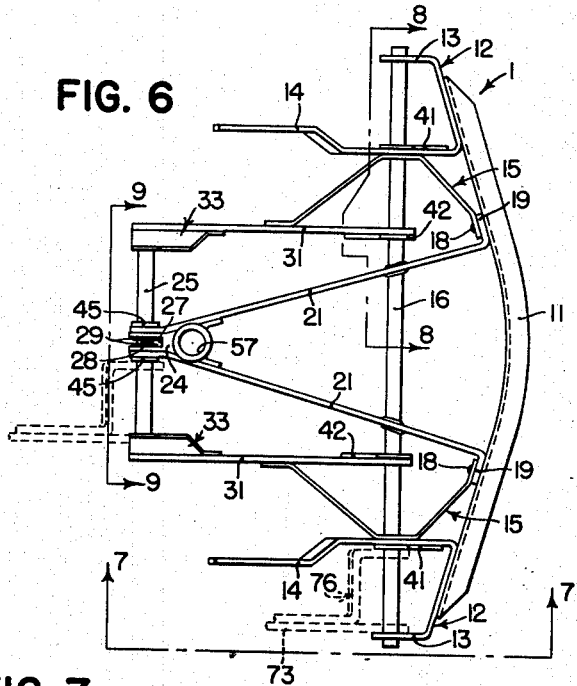
Figure 6 is a plan view of the frame of the machine shown in Figure 1.
Figures 7, 8:
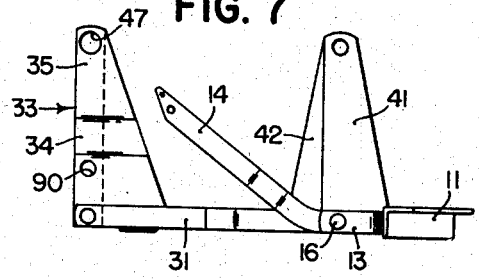
Figure 9:
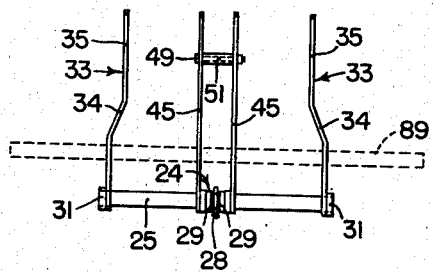

Figures 7, 8 and 9 are views taken along the lines 7—7, 8—8 and 9—9, respectively, of Figure 6.

Figure 1:
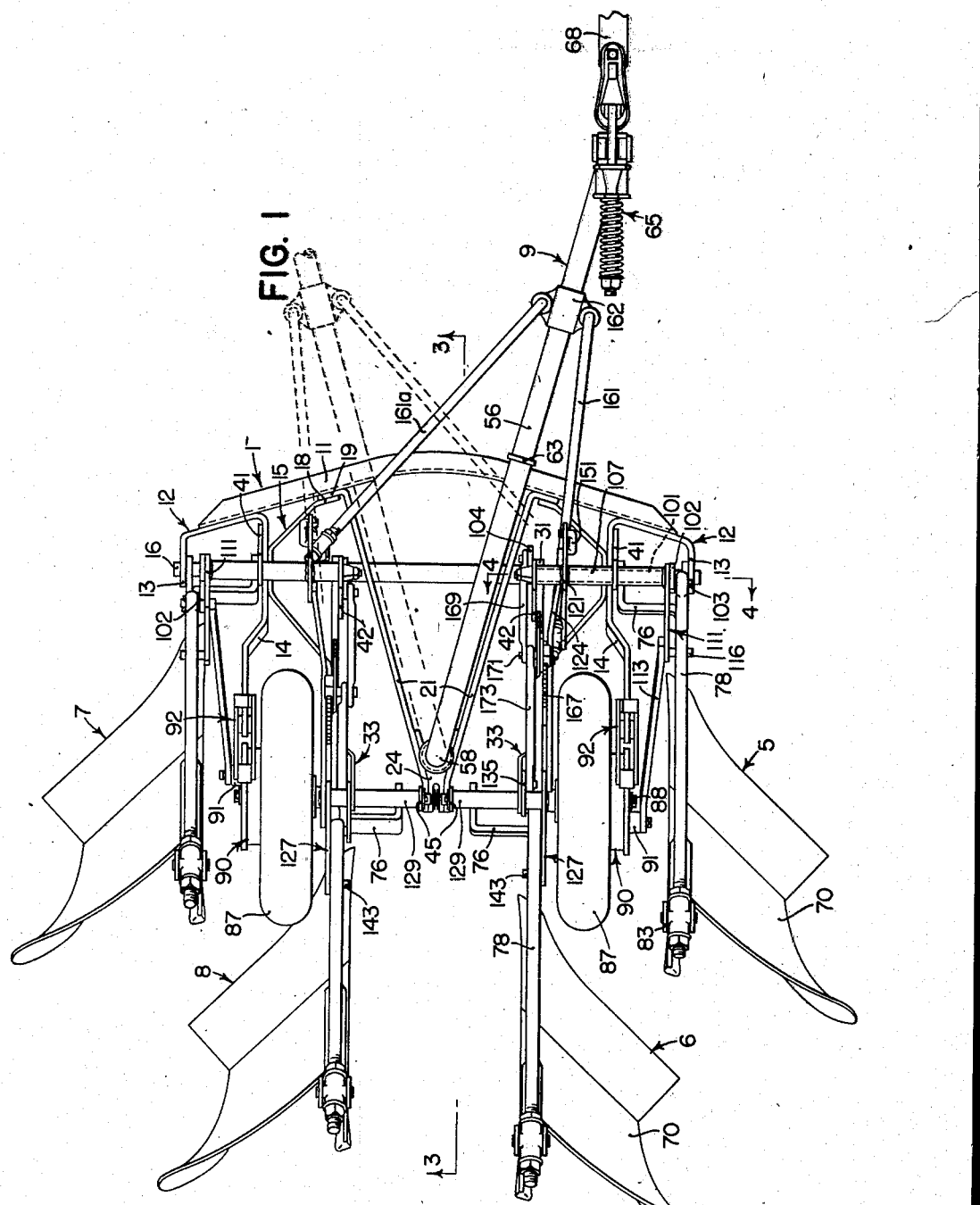
Figure 1 is a plan view of a two-way plow in which the principles of the present invention have been incorporated.
Figure 2:
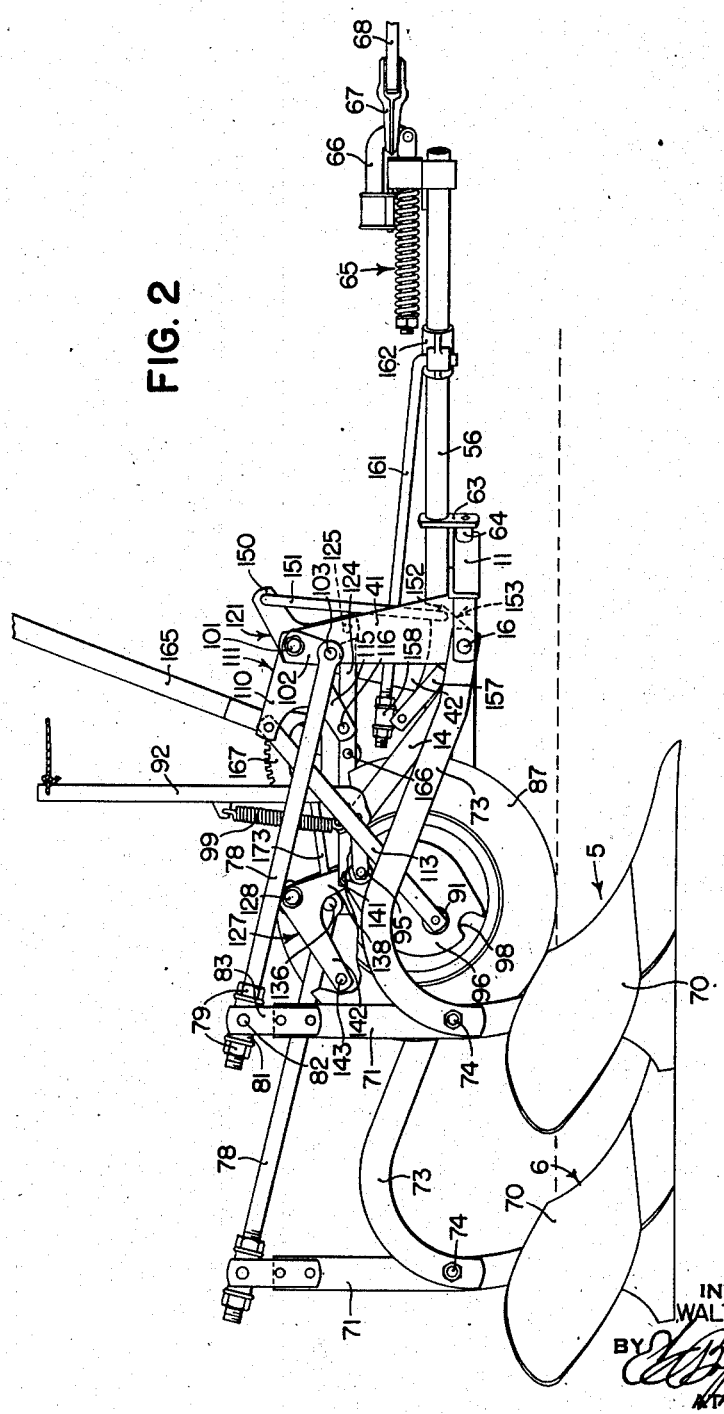
Figure 2 is a side view of the implement shown in Figure 1.
Figure 3:
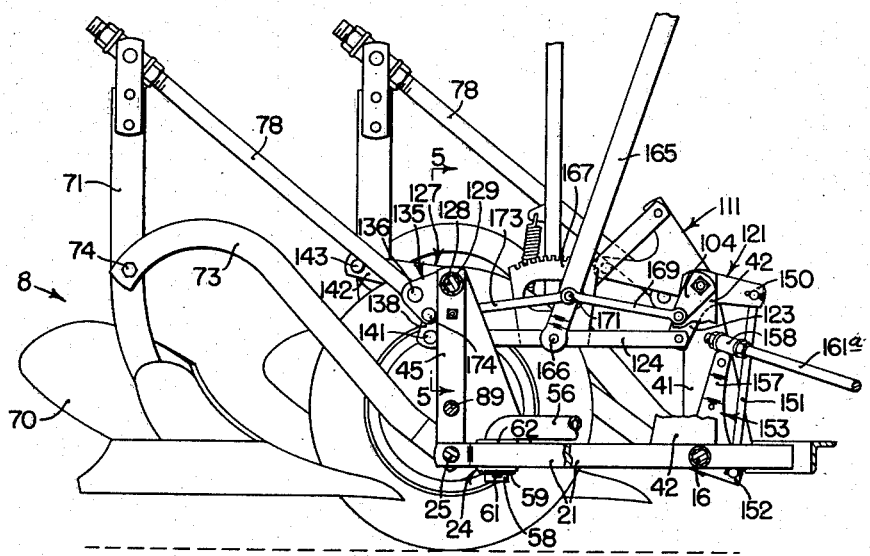
Figure 3 is a view taken generally along the line 3—3 of Figure 1, showing the raised position of the left hand plowing units.
Figure 4:
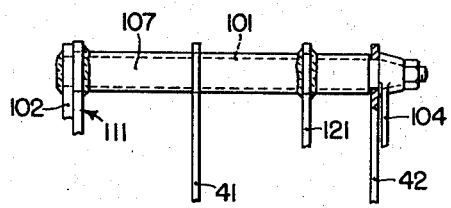
Figure 4 is a fragmentary view taken along the line 4—4 of Figure 1.
Figure 5:
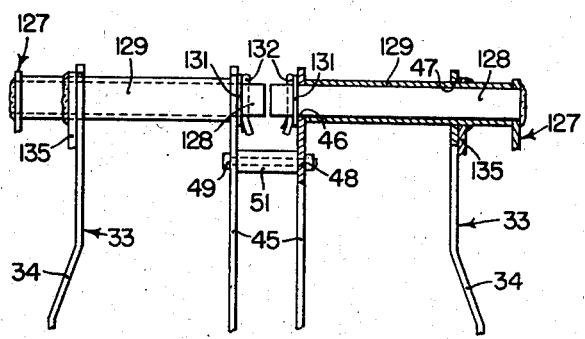
Figure 5 is a fragmentary view taken along the line 5—5 of Figure 3.

Referring now to the drawings, more particularly to Figures 1-3, the reference numeral 1 indicates the frame of the implement in its entirety, and connected with the frame are two pairs of right and left hand plowing units 5, 6 and 7, 8. Also connected to the frame 1 is a laterally swingable hitch indicated in its entirety by the reference numeral 9.

The frame 1 comprises a curved or arched cross bar 11, preferably of angle section, and secured to each end of the bar 11 is a generally U-shaped strap member 12 having a rearwardly directed laterally outer end 13 and a rearwardly and upwardly directed laterally inner end portion 14. The laterally inner end portion 14 of each of the frame members 12 extends rearwardly and upwardly, as best shown in Figure 2, and terminates in a supporting section for a clutch control lever to which reference will be made below. Each strap member 12 is apertured to receive a draft rod 16 that extends transversely therethrough. The frame 1 also includes a second strap member 15, disposed laterally inwardly of the strap member 12, there being a strap member 15 at each side of the frame. The forward end of the member 15 is bent so as to be directed laterally and is bolted or riveted, as at 18, over the laterally outer turned end 19 of an associated frame bar 21. There is a frame bar 21 at each side of the frame, as best shown in Figure 1, the bars 21 converging rearwardly and bolted or otherwise fastened to a central hitch casting 24 which is generally V-shaped and is apertured, as are the rear ends of the frame bars 21, to receive a laterally extending draft rod or shaft 25 that extends from one side of the implement to the other. The hitch casting 24 has a rearwardly opening notch 27, and the central portion of the shaft 25 is provided with an aperture to receive a cotter pin 28 which is disposed between a pair of thrust washers 29 and cooperates with the casting 24 to prevent displacement of the shaft 25. The forward shaft 16 extends through an opening in the front portion of each of the bars 21 and preferably is welded thereto whereby lateral displacement of the front shaft 16 is prevented. The rear end of each of the strap members 15 is bent so as to lie substantially flush against the longitudinally extending frame bar 31, the forward end of which is apertured to receive the front shaft 16. The rear end of the frame bar 31, there being a frame bar 31 at each side of the implement, is bolted or riveted to an upwardly extending standard 33, the intermediate portion 34 of which is bent so as to dispose the upper end 35 of the standard in a plane disposed laterally inwardly of the plane of the associated frame bar 31. There is one of the standards 33 at each side of the frame, and the rear portion of each standard 33 extends rearwardly beyond the end of the associated frame bar 31, this lower portion of each of the standards 33 being apertured to receive the rear shaft 25. A pair of front standards 41 and 42 form a part of the frame 1, the laterally outer standard 41 being secured to the laterally inner portion of the outer strap member 12 by the same bolts or other fastening means that secures the intermediate portion of the laterally inner strap member 15 thereto, the shaft 16 passing through an opening in the lower end of the standard 41. The other standard 42 is also apertured to receive the shaft 16 and is fastened, as by bolts or the like, to the front end of the frame bar 31. The standards 41 and 42 at the other side of the machine are of like construction and mounting. A pair of straps 45 are secured to the sides of the rear ends of the frame bars 21, the straps 45 extending upwardly in generally parallel relation with respect to the laterally outer standard 33 described above. The upper ends of the straps or struts 45 are apertured, as at 46, these apertures being in line with apertures 47 formed in the upper end 35 of the standards 33. The upper ends of the struts 45 are also provided with apertures 48 below the apertures 46. A bolt 49 is extended through the lower apertures 48 and also through a spacing sleeve 51 so that when the bolt 49 is tightened, the spacer 51 maintains the upper ends of the bars 45 in the desired position.

The hitch member 9 includes a pipe or rod 56 the rear end 58 of which is bent downwardly and is inserted in an opening 57 in the casting 24, as best shown in Figure 3. Any suitable means, such as a washer 59 and a cotter 61, is used for holding the rear end of the draft member 56 in position. Preferably, a bushing 62 is provided as a bearing between the downturned end of the member 56 and the opening in the casting 25. A bracket 63 is fixed to the hitch member 56 and carries a roller 64 that engages under the upper flange of the frame angle 11 for guiding the member 56 when swinging from one side toward the other. A spring cushion release hitch 65 is pivoted to the front end of the member 56, but otherwise is of conventional construction, and includes a draft hook 66 in which a clevis 67 is engaged. The clevis 67 is connected to a drawbar 68 of a conventional farm tractor. The mechanism for swinging the hitch member 56 from one position to the other, with the spring cushion release hitch 65 disposed in front of one or the other pairs of furrow openers, will be described below.

Each of the plowing units 5, 6, 7 and 8 is substantially identical with the others, and hence a description of only one unit will suffice. The forward right hand furrow opener 5 comprises a moldboard plow bottom 70 of conventional construction, fixed in any suitable manner to the lower end of a generally vertically extending standard 71. The plow bottom 70 and its standard 71 is connected with the frame 1 by a pair of parallel links, the lower of which is in the form of a plow beam 73 the rear portion of which curves generally downwardly and rearwardly and is pivoted, as at 74, to the lower portion of the standard 71. The forward end of the plow beam or link member 73 is apertured and receives the forward shaft 16. The beam 73 is held against tipping about a generally longitudinal axis by a Z-shaped bracket 76, one end of which is bolted or otherwise fixed to the front end of the beam 73 and the other end of which is apertured and receives the front shaft 16, as shown in dotted lines in Figure 6.

The upper link is indicated by the reference numeral 78 and comprises a rod screw-threaded at its rear end to receive a pair of lock nuts 79 which engage opposite ends of a swiveled sleeve 81 through which the rear end of the rod 78 passes. The sleeve 81 is provided with trunnions 82 by which the sleeve is supported on a pair of upstanding brackets 83 fixed in any suitable manner to the upper end of the standard 71. The plow beam 73 and the upper link 78, the latter being connected with the frame 1 through adjusting mechanism which will be described below, permit the plow bottom to swing generally vertically without materially changing the angular position of the plow bottom, or in other words, without increasing or decreasing the suck by any material amount. The amount of suction may be adjusted, however, by depth controlling means that acts through the upper link 78 which, as stated above, will be described presently. Each of the plowing units 5, 6, 7 and 8 is constructed as just described, and since the parts are identical, except that certain may be right hand parts while others are left hand parts, the same reference numerals have been used for identical parts. It will be noted, however, that the rear right hand plowing unit 6 is disposed not only laterally inwardly but also rearwardly of the forward plowing unit 5. Therefore, the beam 73 for the plowing unit 6 and the associated Z-shaped bracket 76 are apertured to receive the rear shaft 25.

The right hand plowing units 5 and 6 are so interconnected that they may be adjusted for depth and raised and lowered by mechanism common to both units, and this mechanism will now be described. The frame 1 is supported on a pair of ground wheels 87 which are disposed substantially directly in front of the rear plowing units 6 and 8. Both ground wheels 87 are mounted for rotation on the outer ends of a wheel shaft 88 that extends through openings 89 in the inner and outer brackets 45 and 33 at each side of the frame, the axle shaft 88 extending laterally at each end outwardly beyond the bracket 33. Each wheel is provided with half-revolution clutch mechanism indicated in its entirety by the reference numeral 90 and preferably of conventional construction, each including a driven crank member 91 the rotation of which is under the control of a clutch trip lever 92 (Figure 2), which shows the right hand clutch and associated mechanism. When the clutch lever 92 is moved to carry a roller 95 out of a notch in a plate 96 forming a part of the driven clutch member, the clutch is engaged and the crank 91 is rotated by the rotation of the associated ground wheel 87 through substantially ninety degrees, whereupon a driving connection is automatically disengaged by the roller 95 falling in the other notch 98, a spring 99 acting against the lever 92 for urging the roller 95 generally radially inwardly.

The vertically extending brackets 41 and 42 at the right side of the machine support a cross shaft 101 to the outer end of which is welded an arm 102. The arm 102 extends generally downwardly and carries a pivot 103 to which the forward end of the associated link 78 is connected. The laterally inner end of the shaft 101 is squared and tapered, and receives the correspondingly shaped hub of another arm 104. Disposed about the shaft 101 and between the arms 102 and 104 is a sleeve member 107 which is rockably mounted in the upper end of the laterally outer standard 41, and a power lift arm 110 is secured, as by welding or the like, to the laterally outer end of the sleeve 107. The arm 110 is a part of a bell crank indicated in its entirety by the reference numeral 111, and the arm 110 is connected by a link 113 to the crank 91, as best shown in Figure 2. The other arm of the bell crank 111 is indicated at 115 and this arm carries a laterally outwardly directed pin 116 which underlies the upper link 78 that is connected to the pin 103.

An arm 121 is welded or otherwise permanently secured to the sleeve 107 and includes an arm section 123 to which the forward end of a longitudinally extending link 124 is pivoted, as at 125. The rear end of the link 124 is connected to a bell crank 127 which is welded to a shaft 128 (Figure 2) which is journaled for rocking movement in a sleeve 129 supported in the upper opening 47 in the wheel bracket 33. The laterally inner end of the sleeve 129 abuts the laterally outer face of the laterally inner standard 45, the shaft 128 extending laterally inwardly through the opening 46 in the upper end of the standard 45, the shaft 128 being retained therein by a washer 131 and a cotter 132. The laterally outer end of the sleeve 129 receives a double arm 135, the arm 135 being welded or otherwise permanently fixed to the outer end of the sleeve 129. One section of the arm 135 carries a pivot 136 to receive the forward end of the upper link 78 of the rear right hand plowing unit 6. The bell crank 127 that is welded to the outer end of the shaft 128 is provided with one arm section 138 that carries a pivot 141 to which the rear end of the link 124 is connected. The other section of the arm 127 is indicated at 142, this section having a pin 143 underlying the upper link 78 of the rear right hand plowing unit 6. This last mentioned link is pivoted, as at 136, to the double arm 135.

By virtue of the construction as so far described, whenever the power lift clutch, as for the right hand unit, shown in Figure 2, is engaged for half a revolution, a thrust is exerted upwardly and forwardly against the bell crank 111, causing it to rotate in a clockwise direction (Figure 2) which carries the pin 116 up against the link 78, thereby raising the plowing unit substantially into a position corresponding to the position of the left hand plowing units 7 and 8 shown in Figure 3. Clockwise movement of the bell crank 111 (Figure 2) acts through the sleeve 107 to swing the bell crank 121 in a corresponding direction, exerting a rear thrust through the link 124 to the bell crank 127 for the rear right hand plowing unit 6, causing the pin 143 carried on the arm section 142 thereof to engage the link 78 for the rear right hand unit and raise it into a position corresponding to that shown in Figure 3.

The bell crank 121 includes a forwardly extending section 150 to which the upper end of a vertical link 151 is connected. The lower end of the link 151 is pivoted to an arm 152 of a bell crank 153 fixed to a sleeve 154 that is mounted for rocking movement on the front shaft 16, the sleeve 154 being confined between the front end of the bar 31 and the intermediate portion of the strap member 15. The bell crank 153 includes an upwardly extending arm section 157 to the upper end of which a sleeve 158 is swiveled. The sleeve 158 receives the rear end of a link 161, the rear end of the latter being screw-threaded and receiving a pair of lock nuts for fixing the link 161 to the swiveled sleeve 158. The link 161 extends forwardly and has its forward end downturned and received in a slide member 162 carried by the hitch member 56. Whenever the power lift clutch is actuated, causing the bell crank 111 and the rock shaft 107 to rock, the corresponding movement of the bell crank 121 acts through the link 151 and the lower bell crank 153 to exert a generally forward or rearward thrust which moves the slide 162 to a different position and effects the movement of the hitch member 9 from one position to another generally about the axis of its pivotal connection with the casting 24.

The control lever 92 for the clutch is mounted on the upturned portion 14 of the frame member 12.

Mounted on the link 124 that connects the bell crank member 121 at the front of the frame with the bell crank member 127 is a manually controlled depth adjusting lever 165 that is pivoted as at 166 (see Figure 3) to the link 124. The link also carries a sector 167 which cooperates with the usual detent mechanism (not shown) carried on the lever 165. A link 169 extends forwardly from a pivot 171 carried on the lever 165 to the arm 104 fixed to the squared tapered end of the shaft 101. A second link 173 extends from the pivot 171 rearwardly to the other arm section of the double arm 135, to which the forward end of the upper link 78 of the rear inside plowing unit 6 is connected.

While I have described in detail the construction of the right hand plowing units, it is to be noted that the left hand plowing units are of substantially identical construction, except that some parts may be left hand rather than right hand. Therefore it is believed that further detailed description is unnecessary, and parts at the left side of the machine that are identical with the corresponding parts at the right side have been indicated by the same reference numerals.

The operation of the two-way plow of the present invention is substantially as follows. Figures 1 and 2 show the parts of the right hand plowing units when they are in operating position, the left hand units being in a raised or transport position as shown in Figure 3. For reasons which will be explained below, this arrangement of the parts causes the hitch 9 to be swung over into the position shown in Figure 1, when the right hand bottoms are in operating position. Assuming, first, that it is desired to raise the tools 5 and 6 into transport position; this is done by releasing the clutch by pulling the hand lever 92 generally forwardly, which causes the roller 95 to be released from the notch, permitting the crank 91 to turn in a clockwise direction, Figure 2. The first stage of this action is to decrease the depth of plowing. This takes place by virtue of the arrangement of the parts so that as the bell cranks 111 and 127 are swung in a clockwise direction (Figure 2), carrying with them the link 124 and the lever 165, the corresponding movement of the links 173 and 169 acts to move the upper links 78 rearwardly. This decreases the amount of suction and raises the points of the tools so that they tend to run out of the ground, which is the action desired. As the bell cranks 111 and 127 continue their clockwise movement, eventually the space between the pins 116, 143 and the associated links 78 is taken up, whereupon continued clockwise movement of the bell cranks 111 and 127 acts through the upper links to raise the plow bottoms into their transport position, at which time the roller 95 engages in the other notch 98 and effectively holds the bell cranks 111 and 127 against further movement. However, when the parts are in operating position, as shown in Figure 2, moving the adjusting lever 165 to one position or the other acts through the links 169 and 173 to shift the swingable parts 104, 102 and 135 with which the forward ends of the links 78 are connected, so as to tilt the front ends of the plow bottoms upwardly or downwardly, according to whether it is desired to decrease or increase the depth of plowing.

The raising of the right hand plow bottoms from their lowered or operating position to their raised or inoperative position also causes the hitch 9 to swing over into the middle position, since the clockwise movement of the arm 121 acts through the link 151 to thrust forwardly on the link 161, thereby sliding the member 162 outwardly along the bar 9. After the outfit has been turned around at the end of the field it is usually desirable to lower the other set of bottoms. Accordingly, the plow bottoms may be lowered into operating position by tripping the associated clutch mechanism, which causes the bell cranks 111 and 121 (Figure 2) to move in a counterclockwise direction, pulling upwardly through the associated link 151 and causing the hitch 9 to swing over into a position directly in front of the down bottoms. In the lowering operation, it will be noted from Figure 3 that when the points of the plow bottoms first touch the ground, the lowering movement of the bottoms may momentarily be arrested but this does not interfere with a continued counterclockwise movement of the associated bell cranks 111 and 127, the pins 116 and 143 merely moving away from the associated draft links 78. Therefore, in the lowering operation, the clutch is effective to swing the hitch member 9 over into a position in front of the down bottoms before the bottoms pentrate to a point such that the forward pull against the hitch 9 might prevent a completion of the movement of the hitch member into a position in front of the bottoms. In other words, the hitch member is swung from an intermediate position over into a position in front of the bottoms before the latter reach their full depth of plowing. This is an important feature of the present invention and makes it possible to provide a direct connection between the hitch shifting means and the raising and lowering clutch mechanism. The depth of plowing may be adjusted at any time by actuating the depth adjusting lever 165, which exerts a longitudinal pull or thrust on the draft links 78, but in any case the raising action takes place first by tipping the points of the plow bottoms upwardly and then after the plow bottoms have reached their position of shallowest plowing, the bottoms are raised bodily into their transport position.

While I have shown and described above the preferred structure in which the principles of the present invention have been incorporated, it is to be understood that my invention is not to be limited to the particular details shown and described above, but that, in fact, widely different means may be employed in the practice of the broader aspects of my invention.

What I claim and desire to secure by Letters Patent is:

1. A two-way plow comprising frame means, a laterally swingable hitch therefor, a pair of right and left hand plowing units, means movably connecting each unit with said frame means, means for lowering said units alternately, and means operated by said lowering means for simultaneously shifting said hitch.

2. A two-way plow comprising a supporting frame, wheel means therefor, right and left hand plowing units floatingly connected with said frame when in operating position, means for tilting said plowing units to control the depth of operation thereof, means having a one-way connection with each of said plowing units for raising either or both into elevated non-operating position, self-interrupting clutch mechanism driven from said supporting wheels for actuating said lifting means, a laterally swingable hitch connected with said frame, and means operatively connecting said hitch with said clutch means whereby operation of the latter serves to swing said hitch toward one side of the frame when lowering the plowing unit at that side, said means, by virtue of said one-way connection, being movable freely away from said units, thereby providing for a completion of the movement of said hitch and clutch mechanism before the associated plowing unit has moved into its operating position.

3. A two-way plow comprising a draft frame, a pair of right and left hand plowing units connected with said draft frame at generally opposite sides thereof, a laterally swinging hitch connection connected with said draft frame and movable from a position in front of one of said units to a position in front of the other unit, means for raising said units out of operating position, said raising means being movable away from said units in the lowering direction, and means connected with said raising means for swinging said hitch connection from one side to the other and operative to complete the movement of said hitch connection to a position in front of one or the other of said units before that unit has completed its lowering movement into operating position.

4. A two-way plow as defined in claim 3, further characterized by ground wheel means for supporting said draft frame, and means connecting said raising and lowering means and said hitch shifting means with said ground wheel means so as to derive operating energy therefrom during forward travel of the implement.

5. A two-way plow comprising means serving as a relatively short draft frame, supporting means therefor, a pair of right and left hand plowing units adapted for movement alternately into operating position, and means including a pair of forwardly converging generally longitudinally extending links, each link being pivotally connected with said unit and with said draft frame for relatively free swinging movement, whereby said links provide a virtual hitch point for the associated unit forward of said relatively short draft frame.

6. A two-way plow comprising a supporting frame, a pair of ground wheels on which said frame is carried, a laterally swingable draft connection pivotally connected with said frame, a pair of right and left hand plowing units connected for relatively free individual floating movement with said frame, means for tilting each plowing unit in a generally vertical longitudinal plane so as to raise and lower the point of the plow relative to the other portions of the plowing unit and thus increase or decrease the tendency for the plowing unit to run deeper or more shallow, means for raising each plowing unit, said tilt-adjusting means being carried by and movable with said raising means, whereby the operation of the latter serves first to move the tilting means into a position causing the plowing unit to run to a more shallow position, and means actuated by rotation of said ground wheels for operating said raising means.

7. A two-bottom two-way plow comprising frame means, a pair of right hand plowing units, a pair of left hand plowing units, means including a pair of generally vertically spaced longitudinally extending links connecting each plowing unit with said frame, depth adjusting means comprising means at one side of the frame and connected with one link of each of the pairs of links at that side of the frame for tilting the associated plowing units and separate means at the other side of the frame and connected with one of the links of each of the pairs of links at that side of the frame for tilting the associated plowing units, and a pair of separate power lift clutch mechanisms adapted for independent operation and connected, respectively, with the plowing units at opposite sides of the frame.

8. An agricultural implement comprising ground working tool means, a pair of generally vertically spaced draft members connected with said tool means and a pair of interconnected means one movable relative to the other and said interconnected means also being normally movable together and adapted for successively shifting one of said draft members fore and aft, to control the depth of operation of the associated tool means, and applying a lifting force to raise said tool means into inoperative position, and means for adjusting the position of one of said pair of said interconnected means relative to the other.

9. An agricultural implement comprising ground working tool means, a pair of generally vertically spaced draft members connected with said tool means, a pair of arms normally movable together, means connecting one of said arms with one of said draft members for shifting the latter to control the depth of operation of said tool means, means connecting the other arm with said tool means for raising the latter into inoperative position, and means for adjusting the position of one arm relative to the other.

10. A two-way plow comprising a draft frame, a plurality of right hand plowing units, a plurality of left hand plowing units, separate means connecting each unit with said draft frame for movement relative thereto independent of the other units, means for alternately lowering the right and left hand units into operating position, and means for simultaneously adjusting the depth of plowing of all of said units in operating position.

11. A two-way plow comprising a draft frame, a plurality of right hand plowing units, a plurality of left hand plowing units, separate means connecting each unit with said draft frame for movement relative thereto independent of the other units, and means for simultaneously adjusting the depth of operation of the right and left hand units.

12. A two-bottom two-way plow comprising a draft frame, pairs of right and left hand plowing units, said frame including forward transverse draft bar means and rear transverse draft bar means, means connecting the laterally outer right and left hand units to said forward transverse draft bar means, and means connecting the laterally inner right and left hand units to said rear transverse draft bar means.

13. A two-bottom two-way plow comprising a draft frame, pairs of right and left hand plowing units, said frame including forward transverse draft bar means, rear transverse draft bar means, a pair of vertically extending brackets disposed adjacent said rear draft bar means, and a pair of vertically extending brackets disposed at each side of the frame adjacent the associated forward draft bar means, means connecting the laterally outer right and left hand units to said forward transverse draft bar means, means connecting the laterally inner right and left hand units to said rear transverse draft bar means, mechanism on the rear brackets for adjusting the laterally inner plowing units, and mechanism on the forward brackets for adjusting the laterally outer plowing units.

14. A two-way plow of the trailing type comprising a wheel supported frame, a pair of right and left hand plowing units, link means floatingly connecting each plowing unit with said frame, means associated with each plowing unit and operative for successively shifting one of the link means connected therewith in a generally fore and aft direction and applying a lifting force to raise the associated plowing unit into inoperative position, and laterally shiftable hitch means controlled by the operation of said last mentioned means.

15. A two-way plow comprising a wheel supported frame adapted to be connected to a propelling vehicle, a laterally shiftable hitch member pivoted to said frame and adapted to be connected to said pulling vehicle, a pair of right and left hand plowing units, means connecting each unit with said supporting frame, said last mentioned means accommodating independent floating movement of each plowing unit, means having a one-way connection with one of said plowing units for raising the same into inoperative position, separately movable means having a one-way connection with the other plowing unit for raising the latter into raised position, means for alternately operating said raising means, and means connecting the latter with said laterally swingable hitch for shifting the latter from one position to the other in accordance with the position of said plowing units.

16. A two-way plow of the towed type, comprising a wheel supported draft frame, laterally spaced right and left hand plowing units connected with said draft frame for generally vertical movement, a laterally swingable hitch member connected with said draft frame, separate means, each having a one-way connection with the associated plowing unit, for raising each plowing unit, mechanism for alternately moving said separate raising means into lowered positions, and means operative concomitantly with said mechanism for shifting said hitch member into a position substantially in front of the plowing unit to be lowered.

17. A two-way plow of the towed type, comprising a draft frame, a laterally swingable hitch, a plurality of right and left hand furrow openers arranged side by side, beam means connecting each furrow opener for vertical swinging movement with said draft frame, separate means at opposite sides of the draft frame engageable underneath each beam means for raising the associated furrow opener and movable away from the beam means to permit the furrow opener to move into operating position, mechanism for moving the beam-engaging means at each side of the draft frame away from the associated beam means, and means controlled by said last named mechanism for shifting said hitch toward one or the other side of said draft frame in accordance with the lowering of said beam-engaging means at said one or said other side so as to automatically shift said hitch toward the side at which the furrow opener is lowered.

18. A plow comprising means serving as a draft frame, a plurality of plowing units, said units being arranged in longitudinally offset relation, link means connecting each unit with said draft frame means for movement relative thereto independent of the other units, means for simultaneously raising said units into transport position, and means for simultaneously adjusting the link means of both of said units so as to vary the operating depth of said units.

19. A plow comprising means serving as a draft frame, a pair of plowing units disposed in side by side relation, a pair of generally vertically spaced links connecting each unit with said draft frame means for movement relative thereto independent of the other plowing unit, and a ground wheel disposed between said pairs of links for supporting said draft frame means.

20. A trailing two-way plow comprising a frame, a pair of right and left hand plowing units, each of said units including a beam pivotally connected with said frame and a furrow opener pivoted to the rear end of said beam, manually controlled means for pivoting each furrow opener on the associated beam for adjusting the depth of operation, means for raising either or both of said units into their transport position, and a laterally swingable hitch connected with said raising means to be shifted into a position at one or the other sides of said frame or in an intermediate position by the operation of said raising means.

21. A two-bottom two-way plow comprising a draft frame, pairs of right and left hand plowing units, said frame including forward transverse draft bar means, rear transverse draft bar means, a pair of vertically extending brackets disposed adjacent said rear draft bar means, and a pair of vertically extending brackets disposed at each side of the frame adjacent the associated forward draft bar means, means connecting the laterally outer right and left hand units to said forward transverse draft bar means, and means connecting the laterally inner right and left hand units to said rear transverse draft bar means.

22. A two-way plow comprising a supporting frame, right and left hand plowing units floatingly connected with said frame when in operating position, means for tilting said plowing units to control the depth of operation thereof, means having a one-way connection with each of said plowing units for raising either or both into elevated non-operating position, means for actuating said lifting means, a laterally swingable hitch connected with said frame, and means operatively connecting said hitch with said actuating means whereby operation of the latter serves to swing said hitch toward one side of the frame when lowering the plowing unit at that side, said raising means being movable away from said units in the lowering direction thereby providing for a completion of the movement of said hitch before the associated plowing unit has moved into its operating position.

23. A two-way plow comprising means serving as a support, a pair of right and left hand plowing units adapted for movement alternately into operating position, and means including a pair of forwardly converging generally longitudinally extending links, each link being pivotally connected with said unit and with said support for relatively free swinging movement, whereby said links provide a virtual hitch point for the associated unit forward of the connections of said links with said support.

24. A two-bottom two-way plow comprising frame means, two right hand plowing units, two left hand plowing units, means including a pair of generally vertically spaced longitudinally extending links connecting each plowing unit with said frame, the corresponding links of said pairs of links being of substantially the same length, whereby the path of permissive movement of each of said units relative to the frame means is substantially the same as the path of movement of each of the other units, and means acting through at least certain of said links for controlling said units.

25. A two-way plow comprising a wheel-supported carriage, a pair of right- and left-hand plowing units connected therewith for generally vertical movement into and out of operating position, means driven from the wheel means of said carriage for raising and lowering said units and having a one-way connection with the latter arranged to permit said raising and lowering means to complete its lowering movement independent of the completion of the movement of said units into a lowered position, a laterally swingable hitch for said carriage, and means connected with said raising and lowering means for shifting said hitch independent of the lowering of said units.

26. A two-way plow comprising a wheel-supported carriage, a pair of right- and left-hand plowing units connected therewith for generally vertical movement into and out of operating position, continuously driven means on the carriage and optionally connectible with said units for raising and lowering them, said continuously driven means having a one-way connection with said units arranged to permit said raising and lowering means to complete its lowering movement independent of the completion of the movement of said units into a lowered position, a laterally swingable hitch, and means connected with said raising and lowering means for shifting said hitch independent of the lowering of said units.

27. A two-way plow comprising a mobile support, a pair of right- and left-hand plowing units connected therewith for generally vertical movement into and out of operating position, means for raising and lowering said units and having a one-way connection with the latter arranged to permit said raising and lowering means to complete its lowering movement independent of the completion of the movement of said units into a lowered position, a laterally swingable hitch for said carriage, and means connected with said raising and lowering means for shifting said hitch independent of the lowering of said units.

WALTER H. SILVER.